United States Patent
Subramanya et al.

(10) Patent No.: US 9,229,700 B2
(45) Date of Patent: Jan. 5, 2016

(54) METHODS AND SYSTEMS FOR DYNAMIC UPGRADE OF AN ACCESS MANAGER

(71) Applicant: Oracle International Corporation, Redwood Shores, CA (US)

(72) Inventors: Ramya Kukkehali Subramanya, Bangalore (IN); Madhu Martin, Bangalore (IN)

(73) Assignee: Oracle International Corporation, Redwood Shores (*) Notice: Subject to any disclaimer, the term of this patent is extended or adjusted under 35 U.S.C. 154(b) by 273 days.

(21) Appl. No.: 13/749,509

(22) Filed: Jan. 24, 2013

(65) Prior Publication Data

US 2014/0208304 A1    Jul. 24, 2014

(51) Int. Cl.
  G06F 9/44   (2006.01)
  G06F 9/445  (2006.01)

(52) U.S. Cl.
  CPC .................................. *G06F 8/65* (2013.01)

(58) Field of Classification Search
  USPC ............... 717/170, 176; 726/15, 25; 709/203, 709/217, 222, 223; 370/252, 255; 707/621; 719/311; 455/411, 435.1; 713/100, 156
  IPC ........... G06F 8/65,8/68, 11/302, 11/3051; Y10S 707/99939; H04L 67/125; H04W 4/001
  See application file for complete search history.

(56) References Cited

U.S. PATENT DOCUMENTS

| | | | |
|---|---|---|---|
| 6,385,770 B1 | 5/2002 | Sinander | |
| 6,389,589 B1* | 5/2002 | Mishra et al. | 717/170 |
| 6,862,616 B1* | 3/2005 | Tompkins | 709/223 |
| 7,565,519 B1 | 7/2009 | Kumar et al. | |
| 7,721,258 B2 | 5/2010 | Chamberlain et al. | |
| 8,041,820 B2 | 10/2011 | Ogg et al. | |
| 2004/0168165 A1* | 8/2004 | Kokkinen | 717/168 |
| 2006/0048130 A1* | 3/2006 | Napier et al. | 717/168 |

(Continued)

FOREIGN PATENT DOCUMENTS

KR   2007-109149 A   11/2007

OTHER PUBLICATIONS

Chandiramani et al, "Saving time and labor on Oracle Patching with Enterprise Manager Provisioning Pack", Jan. 2008, pp. 1-13 <PatchingEMP08.pdf>.*

(Continued)

*Primary Examiner* — Tuan Vu
(74) *Attorney, Agent, or Firm* — Kilpatrick Townsend & Stockton LLP

(57) ABSTRACT

Methods and systems are described for upgrading an access manager framework. In response to an upgrade request from a client, current and new versions of the access manager framework are identified. Upon successful identification of the current version, one or more supported upgrade paths are determined for the upgrade process. An appropriate upgrade path from the current version to the new version is determined upon successful identification of the current and/or new version of the access manager framework. In response to determination of the appropriate upgrade path, a version specific program upgrade component and a version specific upgrade program are associated with the determined upgrade path. In addition, a set of information may be extracted from the access manager framework, transformed, and imported to the upgraded access manager framework based at least in part upon the determined version specific upgrade program and the version specific program upgrade component.

18 Claims, 7 Drawing Sheets

(56) References Cited

U.S. PATENT DOCUMENTS

2006/0064582 A1* 3/2006 Teal et al. .................... 713/156
2008/0178173 A1* 7/2008 Sriram et al. ................. 717/176
2010/0257539 A1* 10/2010 Narayanan et al. ........... 719/311
2011/0182341 A1 7/2011 Mishra et al.
2011/0225575 A1* 9/2011 Ningombam et al. ........ 717/170

OTHER PUBLICATIONS

"Installing the Tivoli Management Framework integration packages," Tivoli, http://publib.boulder.ibm.com/infocenter/tivihelp/v2r1/index.jsp?topic=%2Fcom.ibm.itamos.doc%2Famos60_install34.htm, retrieved Mar. 14, 2012, 6 pages.

"Upgrading from Cisco access manager to Cisco UGM 2.1," Chapter 4, Cisco Universal Gateway Manager Installation, Upgrade, and Troubleshooting Guide, Version 2.1, http://www.cisco.com/univercd/cc/td/doc/product/rtrmgmt/ugm/ugm2_1/install/u21_cam.pdf, 6 pages.

"Upgrade from Novell iChain to Novell Access Manager," Novell, Sep. 2006, http://www.netiq.com/products/access-manager/docs/ichainto_am3_upgradedoc.pdf, 6 pages.

"Access Manager-Quest," Quest Software, http://www.quest.com/access-manager/, Retrieved Mar. 14, 2012, 7 pages.

* cited by examiner

METHODS AND SYSTEMS FOR DYNAMIC UPGRADE OF AN ACCESS MANAGER

CROSS-REFERENCES TO RELATED APPLICATIONS

NOT APPLICABLE

BACKGROUND

1. Field of Art

The present disclosure relates generally to the field of computer resource management. Specifically presented are methods and systems for upgrading frameworks used for computer resource access control and user identity administration.

2. Description of Related Art

Sharing and distribution of information has become the main focus in the computer age. Modern sharing and distribution methods and systems provide resource access regulations. This allows for increased security, reduced operational costs, and improved usability of shared and/or distributed resources.

Companies and agencies providing information would benefit from resource access regulations provided by sharing and distribution methods and systems. For example, these organizations may regulate their employees' access to various corporate data to control who can access what resource. For instance, an employee portal system may be protected with a username and password, but for a more sensitive HR self-service application that deals with sensitive data, users may be required to be authenticated using an RSA SecurID® token, thus providing a higher level of security to more sensitive resources or applications. Therefore, access management solutions have been developed to implement regulations for accessing resources for resource providers.

Access management solutions may provide centralized authentication, authorization, and auditing to enable single sign-on and secure access control using enterprise resources. For example, Oracle Access Manager, a product of Oracle International Corporation of Redwood Shores in California, is configured to support Enterprise Resource Planning (ERP), Customer Relationship Management (CRM), and Collaboration suite applications.

Generally, access managers are not designed to be easily upgraded. An upgrade process of an access manager involves extensive and complex tasks to be performed by users, for example, system administrators and operators. For instance, upgrading an access manager framework may include as many as 25 manual steps to be performed by a user in order to upgrade the access manager framework from one version to a subsequent version of the access manager framework. A simplified upgrade process of an access manager framework can lead to an optimized and hassle free process while improving the performance of the access manager.

There exists a need in the art for better upgrading techniques using an upgrade framework to provide for easier upgrade process of the access manager and regulate upgrading process within multiple versions. This way, upgrading an access manager becomes a streamlined process requiring minimal, if any, user intervention that can used to meet the widely growing demand of simplified upgrading and management of access managers especially in today's growing complex enterprise environments.

BRIEF SUMMARY

Embodiments in accordance with the present disclosure relate to upgrading a framework, for example an access manager framework. An upgrading process for an access manager framework generally can be very complex and requires direct supervision and involvement of the administrator of the access manager framework. For example, the system administrator has to perform tens of manual steps to ensure completion of the upgrade process for an access manager framework.

Some embodiments use a plurality of version specific upgrade programs to provide upgrade support for multiple older versions of an access manager framework. For example, a version specific upgrade program may be represented as a binary file in Java® environment. In an embodiment, the binary file may be loaded via a custom class loader for an upgrade process of each specific version.

Some embodiments in accordance with the present disclosure relate to a method for upgrading an access manager framework using an upgrade framework. The method includes extracting a set of policy data from a first version of an access manager framework, the set of policy data used for protecting a resource by the access manager framework, extracting a set of configuration information from the first version of the access manager framework, the set of configuration information used for configuring functionality of the access manager framework, transforming the set of extracted policy data and the set of extracted configuration information, the transformed set of policy data and the set of transformed configuration information being compatible with a second version of the access manager framework, importing the set of transformed policy data to the second version of the access manager framework, and importing the set of transformed configuration information to the second version of the access manager framework.

The method further includes determining one or more upgrade paths from the first version of the access manager to the second version of the access manager based at least in part upon identification of at least one of the first version and the second version of the access manager framework, wherein the one or more upgrade paths are determined dynamically upon receiving an upgrade request from a user, and wherein an upgrade path is identified from the one or more determined upgrade paths using at least one parameter.

Other embodiments in accordance with the present disclosure relate to a method for upgrading an access manager framework using an upgrade framework. The method includes extracting a set of information from the access manager framework, transforming the extracted set of information, where the transformed set of information is configured to be compatible with an upgraded access manager framework, and importing the transformed set of information to the upgraded access manager framework.

The method further includes identifying a first version of an access manager framework, determining a version specific upgrade program for the identified first version of the access manager framework, identifying a second version associated with the upgraded access manager framework, and determining possible upgrade paths from the first of the access manager framework to the second version of the upgraded access manager framework.

The method further includes determining a version specific upgrade program component for each determined possible upgrade path, and associating the determined version specific upgrade program component and the version specific upgrade program with each possible upgrade path.

Yet other embodiments relate to systems and non-transitory machine-readable storage media that employ or store instructions for the methods as described above.

A further understanding of the nature and the advantages of the embodiments disclosed and suggested herein may be realized by reference to the remaining portions of the specification and the attached drawings.

BRIEF DESCRIPTION OF THE DRAWINGS

Various embodiments in accordance with the present invention will be described with reference to the drawings, in which.

The figures will be used below to illustrate different embodiments in accordance with the invention. The figures are specific examples of embodiments and should not be interpreted as limiting embodiments, but rather exemplary forms and procedures.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details.

Generally described are methods and systems for upgrading an access manager framework provided for protecting resources using an upgrade framework. An upgrade process may include minimal user intervention, if any, and usually starts upon receiving a user request for an upgrade. The upgrade framework provides multiple version specific programs so that an appropriate version specific upgrade program can be selected for the upgrade process based at least in part upon the current version and/or destination version of an access manager framework.

One aspect offers to provide a version specific upgrade plugin in addition to the version specific upgrade program so that the upgrade framework can extract a set of information from the current version of the access manager framework, transform the extracted set of information so that it may be compatible with the destination version of the upgraded access manager framework, and import the set of transformed set of information to the upgraded access manager framework.

Figure 1:
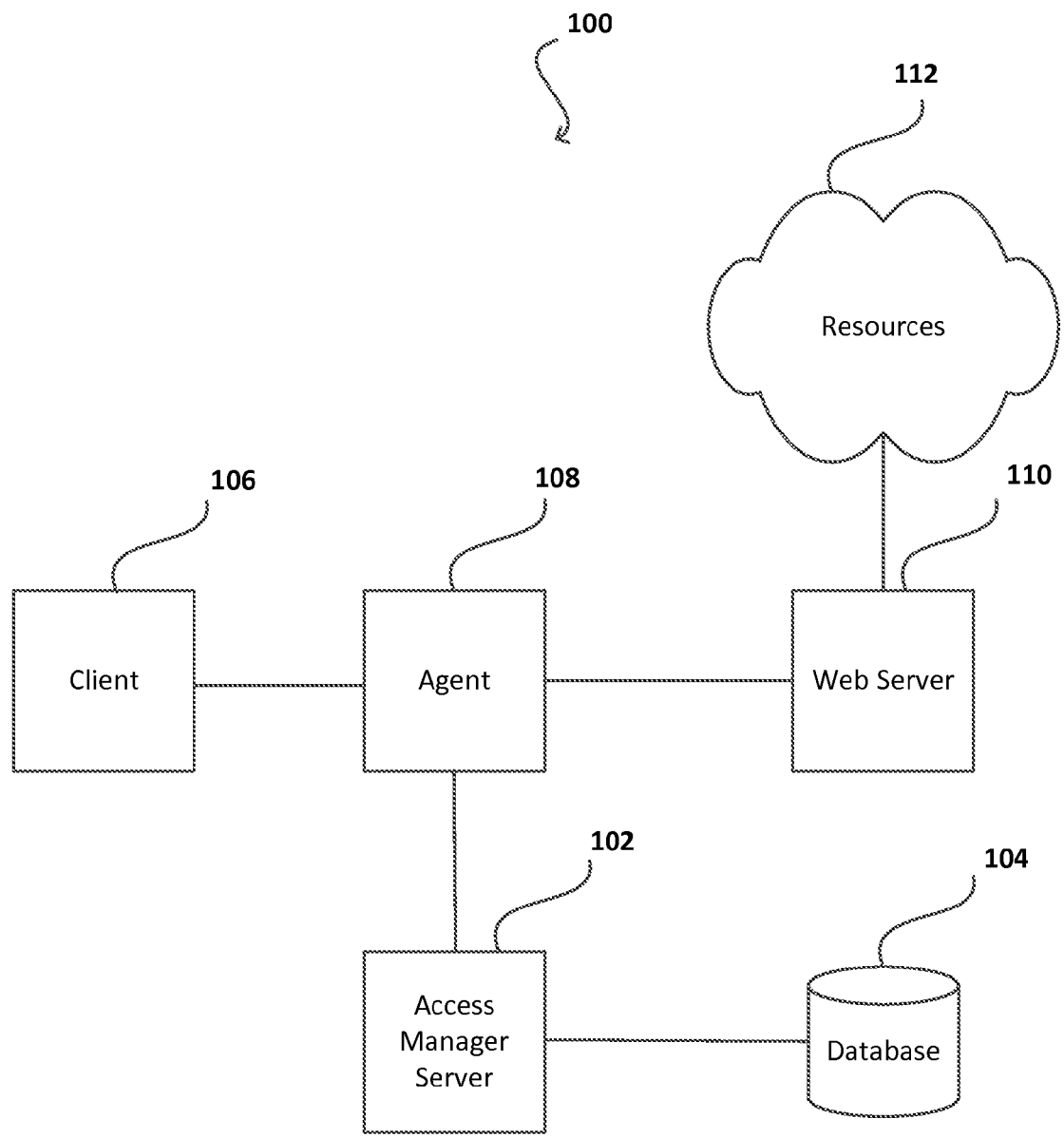
FIG. 1 illustrates components of an exemplary access manager framework in accordance with an embodiment.

FIG. 1 illustrates an exemplary system for an access management operable to protect resources in accordance with an embodiment. Access manager server 102 may be a server that enforces access policies on web and non-web resources, which may specify who can or cannot access a particular resource.

Access policies may restrict access to particular resources by user, static or dynamic group memberships, time of the day or week, IP (Internet Protocol) addresses, etc. The access manager server may provide dynamic policy evaluation as clients access resources and provide authentication and authorization services. Access manager server 102 is connected to one or more databases 104 to utilize information stored in the one or more databases 104 while validating credential information.

Database 104 may store policy data related to configuration and workflow related data. For example, database 104 may include data regarding security component orchestration. Database 104 may also contain user, group, and organization data to facilitate access policy management that may be performed by the access management system components, for example access manager server 102.

Agent 108 is a policy enforcement agent that acts as a filter for resource requests. Agent 108 may intercept resource requests and apply access policies to determine whether the requested resources are protected by the access management system. If so, the resource request is forwarded to access management server 102 to determine whether the client requesting the protected resource may access the protected resource. For example, Webgate, an out of the box solution developed by Oracle International Corporation may be used as an agent so that it can filter the resource requests. It should be noted that agent 108 may be a hardware structure or a combination of hardware and software implementations, in accordance with some embodiments.

Agent 108 receives access requests from client 106, which may be an end-user, (e.g., an employee, customer, supplier, etc.), a system, or a software program requesting access to a resource. If agent 108 determines that the requested resource is not a protected resource or the client is authorized to access the protected resource, the client may be connected to a server, for example web server 110, to receive resource 112. Web server 110 may present information requested by providing web based (HTTP (Hypertext Transfer Protocol)) content to the client 106. In some embodiments resource 112 may be presented as HTML (HyperText Markup Language) so that it may be rendered in the client's browser.

Access managers usually have multiple components for authentication and/or authorization processes. For example, an access manager may include one or more authentication schemes. Authentication schemes protect specific resources using one or more access policies and may include details about a credential collection mechanism and type of credential collector used to collect credentials. For example, credential collection may occur using an HTTP(S) transport channel that is handling HTTP(S) request from a remote client.

In an embodiment, the authentication scheme may identify a redirect URL (Uniform Resource Locator), which is used to notify the client of the success or failure of the authentication and/or authorization processes. In addition, authentication schemes may identify an authentication level indicating the trust level to protect transport of credentials from the client. In some embodiments, the authentication level maybe an integer assigned from 0 to 99. For example, an LDAP (Lightweight Directory Access Protocol) scheme may be at authentication level 2 with an LDAP authentication module to protect Manager-related resources, e.g., URLs, based on a form challenge method. In the form challenge method, an HTML form with one or more text input fields may be used to gather credential information. In some embodiments, the form-based challenge may collect credentials such as username and password, social security number, date of birth, one time password, or a combination of other common parameters.

Figure 2:
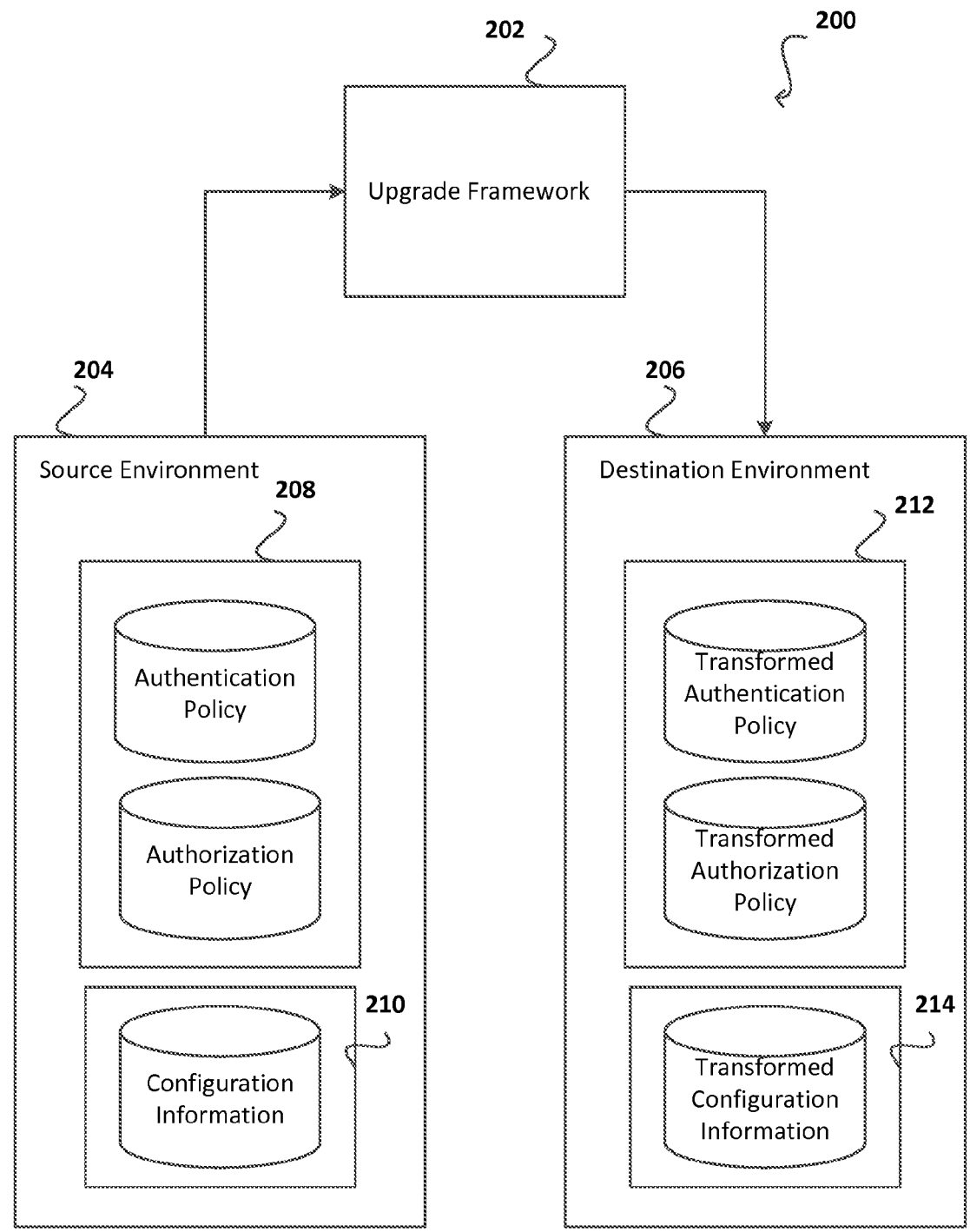
FIG. 2 illustrates components of an exemplary system in accordance with an embodiment.

As illustrated in FIG. 2, an upgrade framework may be used to process an upgrade request from a user. For example, upgrade framework 202 may be used to upgrade a current version of an access manager from source environment 204 to destination environment 206, which may include an upgraded version of the access manager. Upgrade framework 202 may work with multiple versions of access managers so that a need for multiple upgrade tools, where each upgrade tool only serving a single version of an access manager, is eliminated. The multi version support of upgrade framework 202 allows for seamless upgrade process performed for multiple older versions of an access manager.

In an upgrade process, there are multiple components within an access manager. For example, policies governing access to resources protected by an access manager may be upgraded in an upgrade process. Policy data 208 may include authentication policies and authorization policies. The authentication policies are used to determine the identity of a client requesting access to protected resources. Created authentication policies may request authentication credentials from the client to determine the claimed identity of the client. For example, a client may be asked for authentication credentials in form of a challenge to authenticate the client. This way, the authentication policies specify the authentication methodology to be used for authentication the client requesting access for a protected resource. In an embodiment, a client may be granted or denied access to a protected resource based on authentication policy evaluations.

In addition to authentication policies, policy data 208 also include authorization policies. The authorization policies are used to determine whether a client has a right to access a requested resource. Authorization policies may be created to specify access conditions for a client requesting access to a protected resource. These conditions are rules (i.e. constraints) to grant or deny access to a protected resource. For example, authorization constraints may be evaluated to allow or deny access based on the outcome of the authorization policy evaluation of authorization credentials provided by a client. In an embodiment, providing insufficient authorization credentials to evaluate the authorization policy may result in automatic denial of a request to a protected resource. For example, insufficient data that fails to verify membership of a client to a specific group may cause automatic denial of the access request. In an embodiment, policy data 208 may be stored in an LDAP directory.

Another component of an access manager that may be processed during an upgrade of the access manager is configuration information 210. Access managers may include configuration information 210 to specifically govern appearance and functionality of the access manager. For example, configuration information 210 may disable a routine IP collection operation identifying an IP address of a client requesting access for a protected resource. In an embodiment, configuration information 210 may be stored in an LDAP directory.

Figure 3:
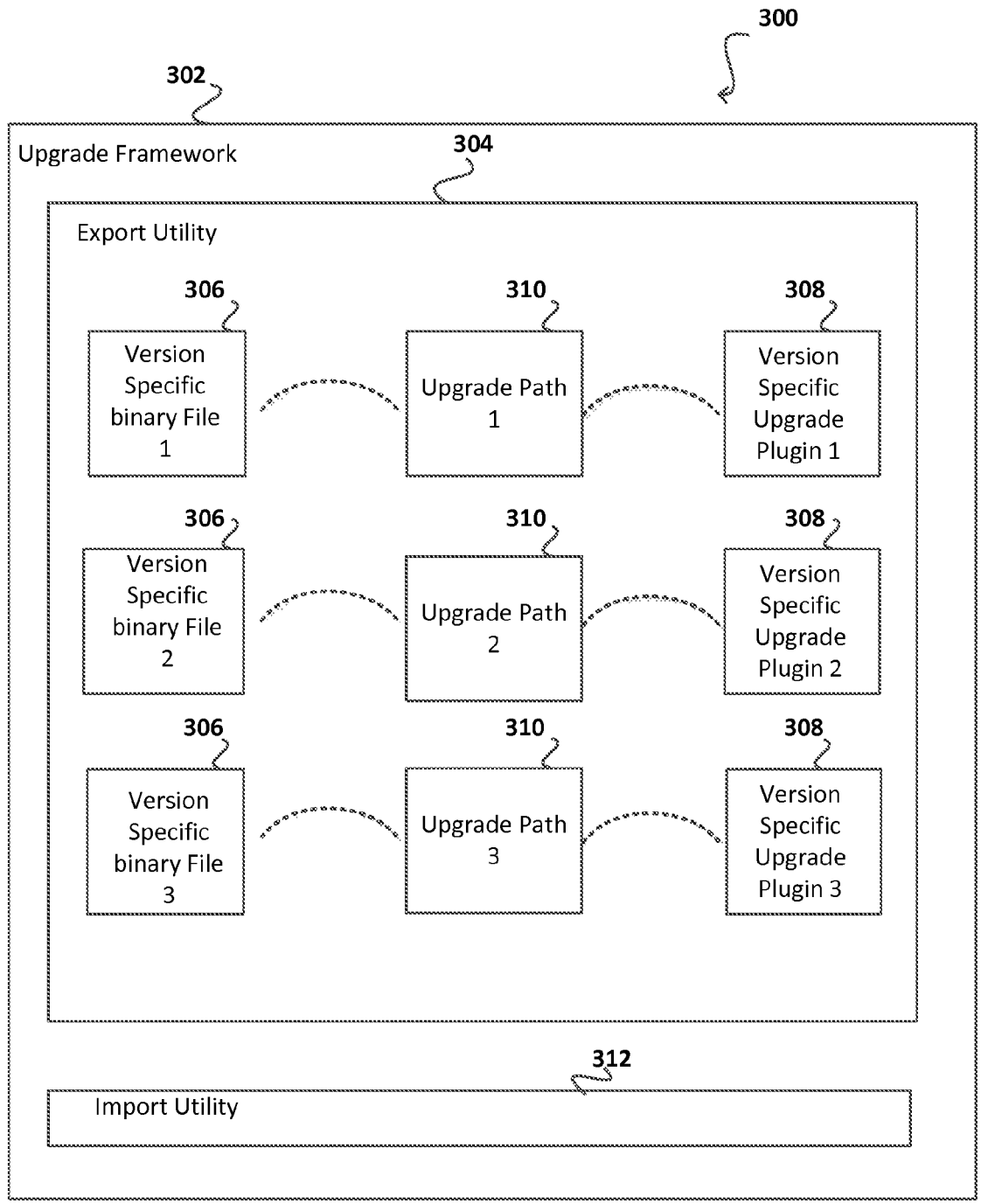
FIG. 3 illustrates components of an exemplary upgrade framework in accordance with an embodiment.

During the upgrade process, policy data 208 and configuration information 210 may be extracted from source environment 204 to be used in destination environment 206. Generally, access managers are not designed to be upgraded and do not include handles to fetch policy data 208 and configuration information 210. Therefore, an export utility, as shown in FIG. 3, is provided to extract policy data 208 and configuration information 210 from the current version of the access manager. In an embodiment, extracting information includes determining which directories include information to be extracted. In another embodiment, policy data and/or configuration information may be written to a file for extraction. For example, if extracted data is exported from an LDAP directory, the extracted data may be written to an LDIF (Lightweight Directory Interchange Format) file. The LDIF file is generally may be used for synchronization and data transfer between LDAP servers with a shared LDAP directory.

Consequently, extracted policy data 208 and configuration information 210 may be transformed to make the extracted data compatible with the destination environment. For example, an access policy having four attributes in a source environment may be extracted and transformed using transformation rules to be compatible with a destination environment in which the same access policy has five attributes.

One or more transformation rules may be used to transform policy data 208 and configuration information 210 to transformed policy data 212 and transformed configuration information 214, in accordance with an embodiment. Each transformation rule can convert existing attribute values of existing logical object and particular system settings to a specified value defined within the transformation rule. For example, a number of password policies having particular number of allowed login attempts in a source environment may be extracted and transformed using a transformation rule to be compatible with the increased or decreased number of allowed login attempts in a destination environment.

In some embodiments, transformed policy data 212 and transformed configuration information 214 are imported to destination environment 206. In an embodiment, importing the transformed information includes determining specific directories in which the transformed information to be imported in. In another embodiment, transformed policy data 212 and/or configuration information 214 are written to a file for importing purpose. For example, if transformed data is imported to an LDAP directory using an LDIF file, the LDIF file may be opened so that the transformed data from the opened LDIF file may be extracted from the LDIF file in a useable format for destination environment 206.

FIG. 3 illustrates components of an exemplary upgrade framework in accordance with an embodiment. Upgrade framework 302 may include multiple components, for example export utility 304 to export policy data and configuration information from an access manager in a source environment. In order for upgrade framework 302 to be an all-in-one solution for upgrading multiple previous version of an access manager to the latest version of the access manager, export utility 304 may include multiple version specific upgrade programs, each of which may be dedicated to work with an older version of an access manager for the upgrading purpose.

Having multiple version specific upgrade programs allows for seamless upgrade process for multiple older versions of an access manager. In some embodiments, the version specific upgrade program may be an object code (i.e. a binary file), which is compiled from a source code, including a sequence of instructions in a computer language. For example, a binary file may be in Java® programming language, where it may be called a class file having .class extension. In an embodiment, multiple version specific binary files may be included in export utility 304, where each version specific binary files 306 corresponds to one of the older versions of an access manager. In this type of implementation, version specific binary files 306 may be used to fetch policy data and configuration information for multiple older version of an access manager, in accordance with some embodiments.

Upgrade framework 302 may include one or more version specific upgrade program components (i.e., upgrade plugins), in accordance with some embodiments. Version specific upgrade plugins 308 may only communicate with specific upgrade API, for example Java® API, in accordance with some embodiments. Version specific plugins 308 allow for extending the upgrade functionality by extracting policy data and configuration information to be transformed and imported to a destination environment. In an embodiment, upgrade plugins may be re-used in other upgrade processes as the upgrade plugins are generally modular and may be developed by a user or any other third-party developer. In an embodiment, version specific upgrade plugin 308 may be bundled with version specific binary file 306 in order to process an upgrade request received from a user.

Each bundled upgrade plugin 308 and version specific binary file 306 may be associated with a supported upgrade path 310, in accordance with some embodiment. The association of each supported upgrade path 310 with the bundled upgrade plugin 308 with version specific binary file 306 may provide for an upgrade solution supporting multiple older version of an access manager. This way, appropriate upgrade plugin 308 with version specific binary file 306 may be determined upon identification of an initial version of an access to be upgraded which indicates an appropriate upgrade path 310 to be used in an upgrade process.

Figure 4:
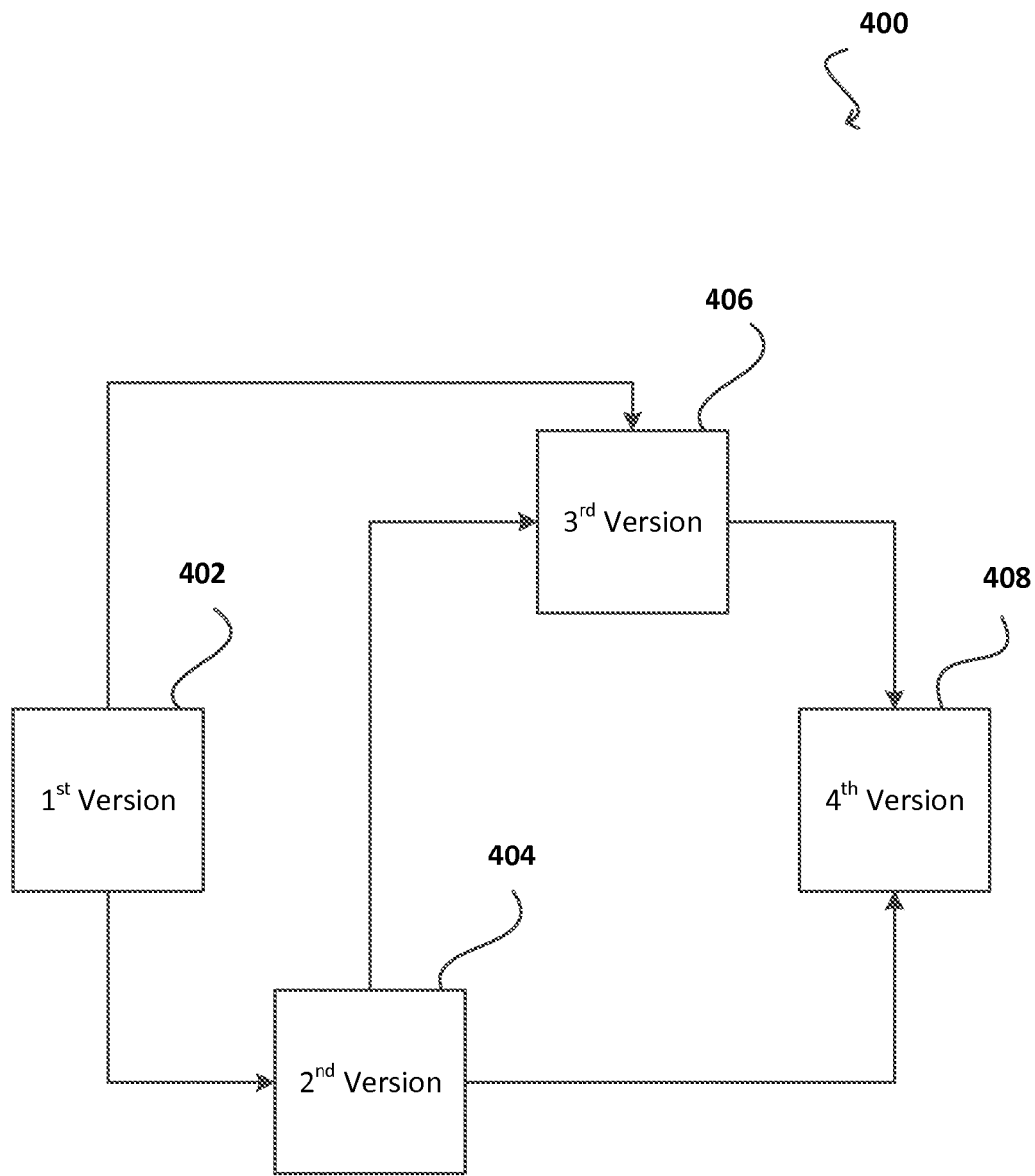
FIG. 4 illustrates exemplary upgrade paths in accordance with an embodiment.

In order for an upgrade framework to dynamically upgrade an access manager, possible upgrade paths may be determined at run-time for a current version of an access manager found in a source environment. In an embodiment, direct and/or indirect upgrade paths may be supported based on determination of an initial version of an access manager. As shown in FIG. 4, there may be any combination of possible upgrade paths available for upgrading an access manager with a particular initial version. For example, a direct upgrade path may not be available for $1^{st}$ version 402 of an access manager to $4^{th}$ version 408 (i.e. the latest version) of an access manager. In another example as illustrated in FIG. 4, $2^{nd}$ version 404 of an access manager may have both direct and indirect upgrade paths to the latest version of the access manager. In an embodiment, a particular upgrade path for a determined version of an access manager may be from a plurality of possible upgrade paths based on one or more parameters, rules, or criteria. For example, parameters considered may include faster execution of the upgrade process, minimal system resource usage, and increased reliability.

In order to start extraction process of policy data and configuration information from a current version of an access manager, determined version specific binary files 306 and version specific upgrade plugins 308 may be loaded in a memory, in accordance with an embodiment. For example, a custom Java® class loader may be used to load the determined version specific binary files 306 and version specific upgrade plugins 308 in memory. Once the determined information is loaded in a memory, the upgrade framework may export relevant policy data and configuration information to process the upgrade request.

Figure 5:
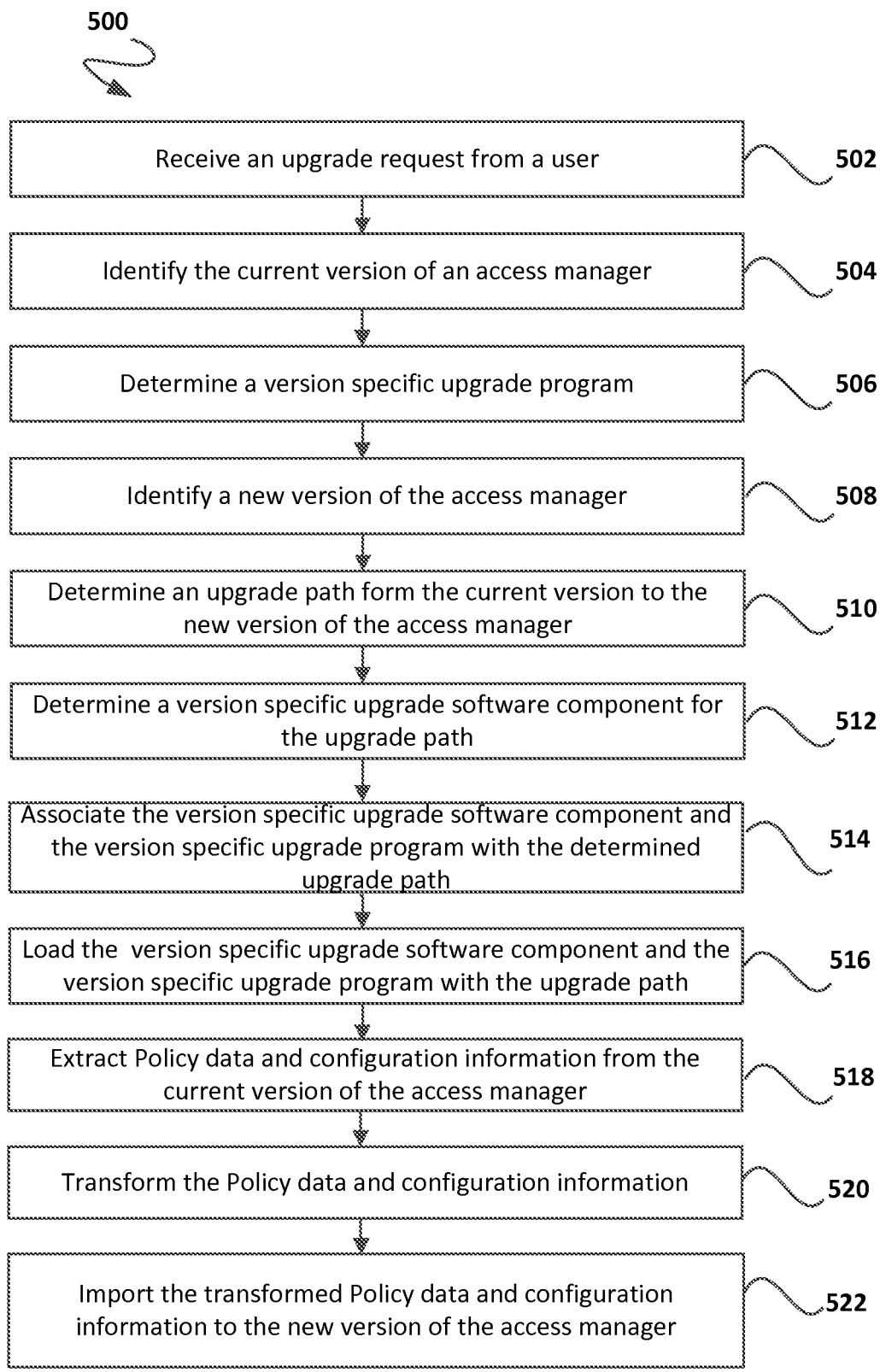
FIG. 5 illustrates operations performed in processing an upgrade request for an access manager in accordance with an embodiment.

FIG. 5 is a flowchart 500 of steps performed for processing an upgrade request of an access manager from a user, in accordance with embodiments of the present invention. Flowchart 500 includes processes of the present invention which, in one embodiment, are carried out by processors and electrical components under the control of computer readable and computer executable instructions. Although specific steps are disclosed in flowchart 500, such steps are exemplary. That is, the present invention is well suited to performing various other steps or variations of the steps recited in the figure. Within the present embodiment, it should be appreciated that the steps of flowchart 500 may be performed by software, by firmware, by hardware or by any combination of software, firmware and hardware.

In operation 502 of process 500, a request to upgrade an access manager is received by an upgrade framework from a user, e.g., an access manager system administrator or a developer, in an embodiment. It is noted that the request can be received by an upgrade framework, e.g., upgrade framework 202 of FIG. 2, where the request may be auto generated from the access manager framework based on one or more rules or criteria, for example based on detecting an availability of a newer version of an access manager.

In operation 504 of process 500, the current version of an access manager may be dynamically identified using an export utility, e.g., export utility 304 of FIG. 3. In Operation 506 of process 500, an appropriate version specific upgrade program, e.g., version specific binary file 308 of FIG. 3 may be determined to export policy data, e.g., policy data 208 of FIG. 2, and configuration information, e.g., configuration information 210 of FIG. 2, from a source environment, e.g., source environment 204 of FIG. 2.

In operation 508 of process 500, a destination version of an upgraded access manager may be identified using an export utility, e.g., export utility 304 of FIG. 3. In operation 510 of process 500, one or more possible upgrade paths, e.g., upgrade paths 310 of FIG. 3, may be determined using the identified current version of the access manager and/or the destination version of the upgraded access manager framework, in accordance with an embodiment.

In operation 512 of process 500, a version specific upgrade software component, e.g., version specific upgrade plugin 308 of FIG. 3, may be determined so that the upgrade framework, e.g., upgrade framework 302 of FIG. 3, can export policy data, e.g., policy data 208 of FIG. 2, and configuration information, e.g., configuration information 210 of FIG. 2, from a source environment, e.g., source environment 204 of FIG. 2.

In operation 514 of process 500, the version specific upgrade program component, e.g., version specific upgrade plugin 308 of FIG. 3, and the version specific upgrade program, e.g., version specific binary file 308 of FIG. 3, are associated with each of the supported upgrade paths, e.g., upgrade paths 310 of FIG. 3

In operation 516 of process 500, the appropriate version specific upgrade program component and version specific upgrade program may be loaded to a memory using a custom Java® class loader, in accordance with some embodiments. This way, the upgrade framework may continue the upgrade process by extracting relevant information from the source environment, e.g., source environment 204 of FIG. 2.

In operation 518 of process 500, relevant policy data, e.g., policy data 208 of FIG. 2, and configuration information, e.g., configuration information 210 of FIG. 2, may be extracted from the source environment, e.g., source environment 204 of FIG. 2. In some embodiments, the extraction process may include writing relevant information to a file, for example LDIF file, which may be used for synchronization and data transfer between LDAP servers with a shared LDAP directory.

In operation 520 of process 500, extracted policy data, e.g., policy data 208 of FIG. 2, and configuration information, e.g., configuration information 210 of FIG. 2, may be transformed so that the transformed information may be compatible with a destination version of an access manager found in a destination environment, e.g., destination environment 206 of FIG. 2. In an embodiment, one or more transformation rules may be applied to transform the extracted information.

In operation 522 of process 500, information may be imported to a destination environment, e.g., source environment 206 of FIG. 2, containing the destination version of the access manager using an import utility, e.g., import utility 312 of FIG. 3. In some embodiments, importing process may include opening and extracting transformed information from an LDIF file so that the transformed policy data, e.g., policy data 212 of FIG. 2, and configuration information, e.g., configuration information 214 of FIG. 2, may be presented in a useable format for a destination environment, e.g., destination environment 206 of FIG. 2.

Figure 6:
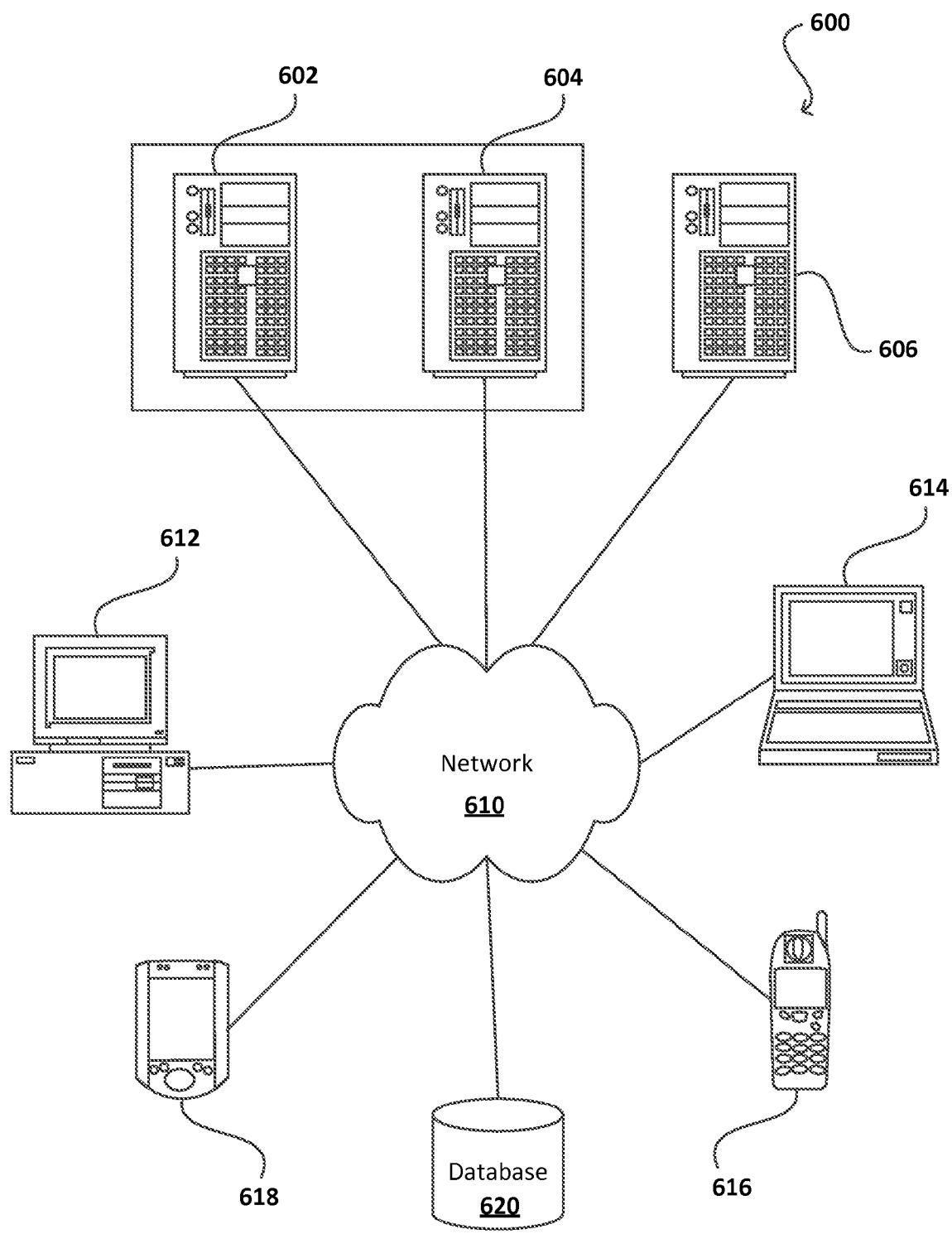
FIG. 6 illustrates components of a computer network that can be used in accordance with one embodiment.

FIG. 6 is a block diagram illustrating components of an exemplary operating environment in which various embodiments of the present invention may be implemented. The system 600 can include one or more user computers, computing devices, or processing devices 612, 614, 616, 618, which can be used to operate a client, such as a dedicated application, web browser, etc. The user computers 612, 614, 616, 618 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 612, 614, 616, 618 may also have any of a variety of applications, including one or more development systems, database client and/or server applications, and Web browser applications. Alternatively, the user computers 612, 614, 616, 618 may be any other electronic device, such as a thin-client computer, Internet-enabled gaming system, and/or personal messaging device, capable of communicating via a network (e.g., the network 610 described below) and/or displaying and navigating Web pages or other types of electronic documents. Although the exemplary system 600 is shown with four user computers, any number of user computers may be supported.

In most embodiments, the system 600 includes some type of network 610. The network may can be any type of network familiar to those skilled in the art that can support data communications using any of a variety of commercially-available protocols, including without limitation TCP/IP, SNA, IPX, AppleTalk, and the like. Merely by way of example, the network 610 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 602, 604, 606 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 606) may be dedicated to running applications, such as a business application, a Web server, application server, etc. Such servers may be used to process requests from user computers 612, 614, 616, 618. The applications can also include any number of applications for controlling access to resources of the servers 602, 604, 606.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 612, 614, 616, 618. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 612, 614, 616, 618.

The system 600 may also include one or more databases 620. The database(s) 620 may reside in a variety of locations. By way of example, a database 620 may reside on a storage medium local to (and/or resident in) one or more of the computers 602, 604, 606, 612, 614, 616, 618. Alternatively, it may be remote from any or all of the computers 602, 604, 606, 612, 614, 616, 618, and/or in communication (e.g., via the network 610) with one or more of these. In a particular set of embodiments, the database 620 may reside in a storage-area network ("SAN") familiar to those skilled in the art. Similarly, any necessary files for performing the functions attributed to the computers 602, 604, 606, 612, 614, 616, 618 may be stored locally on the respective computer and/or remotely, as appropriate. In one set of embodiments, the database 620 may be a relational database, such as Oracle 11g, that is adapted to store, update, and retrieve data in response to SQL-formatted commands.

Figure 7:
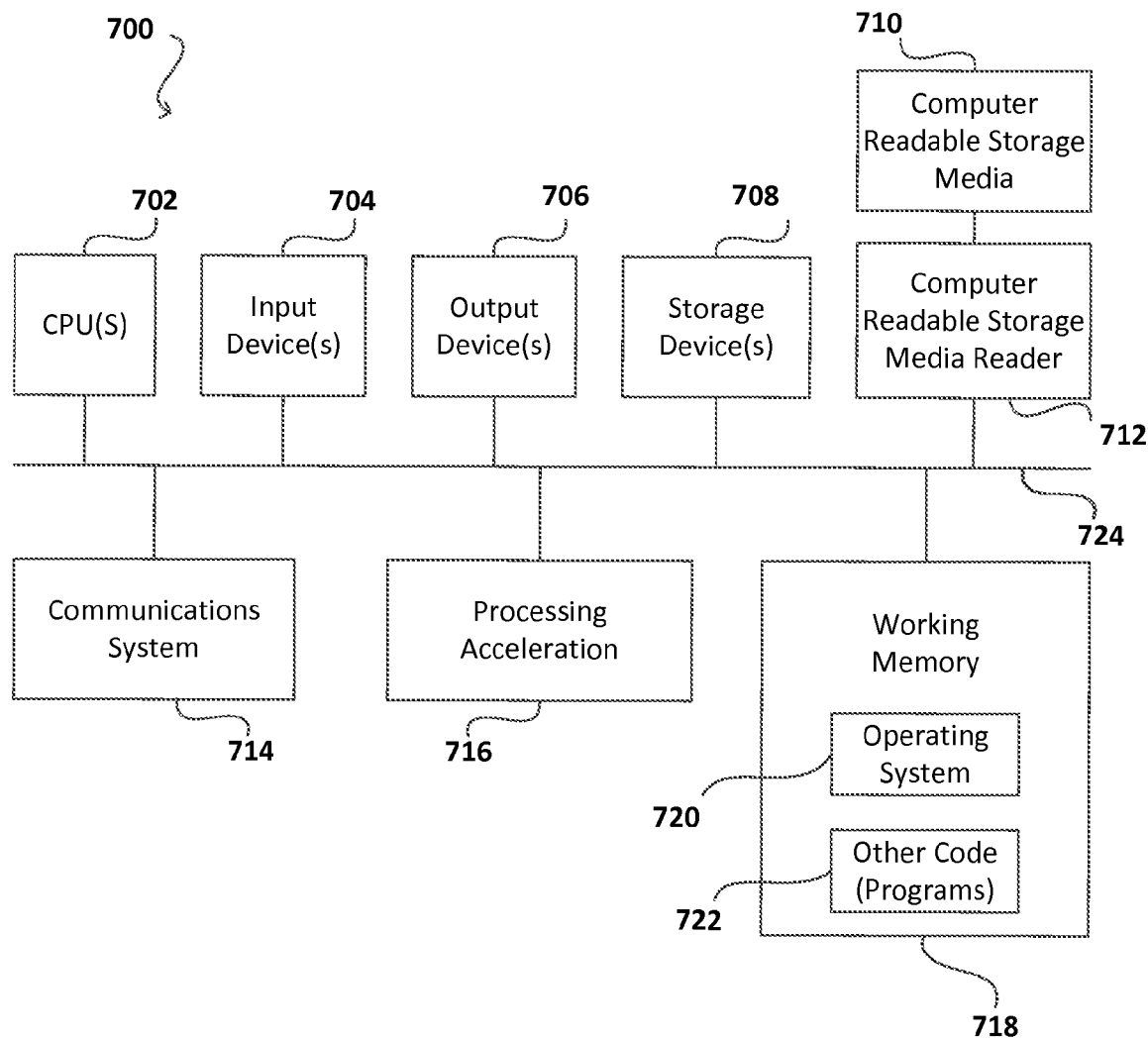
FIG. 7 illustrates components of a computerized device that can be used in accordance with one embodiment.

FIG. 7 illustrates an exemplary computer system 700, in which various embodiments of the present invention may be implemented. The system 700 may be used to implement any of the computer systems described above. The computer system 700 is shown comprising hardware elements that may be electrically coupled via a bus 724. The hardware elements may include one or more central processing units (CPUs) 702, one or more input devices 704 (e.g., a mouse, a keyboard, etc.), and one or more output devices 706 (e.g., a display device, a printer, etc.). The computer system 700 may also include one or more storage devices 708. By way of example, the storage device(s) 708 can include devices such as disk drives, optical storage devices, solid-state storage device such as a random access memory ("RAM") and/or a read-only memory ("ROM"), which can be programmable, flash-updateable and/or the like.

The computer system 700 may additionally include a computer-readable storage media reader 712, a communications system 714 (e.g., a modem, a network card (wireless or wired), an infra-red communication device, etc.), and working memory 718, which may include RAM and ROM devices as described above. In some embodiments, the computer system 700 may also include a processing acceleration unit 716, which can include a digital signal processor DSP, a special-purpose processor, and/or the like.

The computer-readable storage media reader 712 can further be connected to a computer-readable storage medium 710, together (and, optionally, in combination with storage device(s) 708) comprehensively representing remote, local, fixed, and/or removable storage devices plus storage media for temporarily and/or more permanently containing, storing, transmitting, and retrieving computer-readable information.

The communications system 714 may permit data to be exchanged with the network and/or any other computer described above with respect to the system 700.

The computer system 700 may also comprise software elements, shown as being currently located within a working memory 718, including an operating system 720 and/or other code 722, such as an application program (which may be a client application, Web browser, mid-tier application, RDBMS, etc.). It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   determining, by an upgrade management system on a computing system, a configuration of an access manager that executes on the computing system, the configuration defining a first version of the access manager that protects access to one or more resources, wherein the configuration includes one or more settings defining functionality of the first version of the access manager, and wherein the first version of the access manager executes based on a policy configuration that defines access to the one or more resources for a plurality of users;
   extracting, by the upgrade management system, a set of policy parameters of the policy configuration for the first version of the access manager, wherein the set of policy parameters indicates an authentication scheme for authenticating a client operated by a user and indicates an authorization policy for determining authentication of each of the plurality of users;
   extracting, by the upgrade management system, the one or more settings indicated by the configuration of the first version of the access manager;
   adjusting, by the upgrade management system, the extracted set of policy parameters to an updated set of policy parameters for an updated policy configuration, the updated policy configuration defining access to the one or more resources by a second version of the access manager for execution on the computing system, wherein adjusting the extracted set of policy parameters includes converting the extracted set of policy parameters for adjustment into the updated set of policy parameters to change from the first version to the second version of the access manager;
   adjusting, by the upgrade management system, the one or more extracted settings to one or more updated settings in an updated configuration for a second version of the access manager, the updated configuration defining functionality for the second version to protect access to the one or more resources;
   storing, by the upgrade management system, the updated set of policy parameters and the one or more updated settings to an import file for migration from the first version of the access manager to the second version of the access manager;
   configuring, by the upgrade management system using the import file, the second version of the access manager for execution on the computing system based on the updated configuration; and
   configuring, by the upgrade management system using the import file, the second version of the access manager to protect access to the one or more resources for a plurality of users based on the updated set of policy parameters in the updated policy configuration;
   changing execution of the access manager on the computing system from the first version to the second version based on configuring the second version of the access manager according to the updated configuration and the updated policy configuration.

2. The method of claim 1, wherein the set of policy parameters and the one or more settings are represented in a first format compatible with the first version of the access manager, and wherein the updated set of policy parameters and the one or more updated settings are represented in a second format compatible with the second version of the access manager.

3. The method of claim 1, further comprising:
   determining one or more upgrade paths for upgrading the access manager from the first version to the second version based at least in part upon identification of at least one of the first version of the access manager and the second version, wherein an upgrade path indicates an upgrade to change from the first version of the access manager to the second version of the access manager.

4. The method of claim 3, wherein the one or more upgrade paths are determined dynamically upon receiving an upgrade request from the user.

5. The method of claim 3, wherein a first upgrade path is identified from the one or more determined upgrade paths using at least one parameter, and wherein the at least one parameter includes an execution speed parameter and a system resource usage parameter.

6. The method of claim 5, further comprising:
   determining a version specific upgrade program based on the first upgrade path; and
   determining a version specific upgrade program component based on the first upgrade path.

7. The method of claim 6, wherein the set of policy parameters and the one or more settings are extracted for the first version of the access manager using at least one of the determined version specific upgrade program and the determined version specific upgrade program component.

8. The method of claim 5, wherein the first upgrade path is an indirect upgrade path for upgrading the first version of the access manager to the second version of the access manager, the indirect upgrade path indicating an upgrade path for upgrading the first version of the access manager to a third version of the access manager and an upgrade path for upgrading the third version of the access manager to the second version of the access manager.

9. The method of claim 1, wherein converting the extracted set of policy parameters for adjustment into the updated set of policy parameters includes merging at least two of policy parameters into the updated set of policy parameters.

10. The method of claim 1, wherein converting the extracted set of policy parameters for adjustment into the updated set of policy parameters includes reducing one or more policy parameters from the set of policy parameters for adjustment into the updated set of policy parameters.

11. The method of claim 1, wherein converting the extracted set of policy parameters for adjustment into the updated set of policy parameters includes adding a plurality of policy parameters to the updated set of policy parameters for adjustment of a policy parameter from the set of policy parameters.

12. An upgrade management system comprising:
a processor; and
memory coupled to the processor, the memory including instructions comprising program code executable by the processor for performing operations comprising:
 determining a configuration of an access manager that executes on a computing system, the configuration defining a first version of the access manager that protects access to one or more resources, wherein the configuration includes one or more settings defining functionality of the first version of the access manager, and wherein the first version of the access manager executes based on a policy configuration that defines access to the one or more resources for a plurality of users;
 extracting a set of policy parameters of the policy configuration for the first version of the access manager, wherein the set of policy parameters indicates an authentication scheme for authenticating a client operated by a user and indicates an authorization policy for determining authentication of each of the plurality of users;
 extracting the one or more settings indicated by the configuration of the first version of the access manager;
 adjusting the extracted set of policy parameters to an updated set of policy parameters for an updated policy configuration, the updated policy configuration defining access to the one or more resources by a second version of the access manager for execution on the computing system, wherein adjusting the extracted set of policy parameters includes converting the extracted set of policy parameters for adjustment into the updated set of policy parameters to change from the first version to the second version of the access manager;
 adjusting the one or more extracted settings to one or more updated settings in an updated configuration for a second version of the access manager, the updated configuration defining functionality for the second version to protect access to the one or more resources;
 storing the updated set of policy parameters and the one or more updated settings to an import file for migration from the first version of the access manager to the second version of the access manager;
 configuring, using the import file, the second version of the access manager for execution on the computing system based on the updated configuration;
 configuring, using the import file, the second version of the access manager to protect access to the one or more resources for a plurality of users based on the updated set of policy parameters in the updated policy configuration; and
 changing execution of the access manager on the computing system from the first version to the second version based on configuring the second version of the access manager according to the updated configuration and the updated policy configuration.

13. The upgrade management system of claim 12, wherein the operations further comprise:
 determining one or more upgrade paths from the first version of the access manager to the second version of the access manager.

14. The upgrade management system of claim 13, wherein the operations further comprise:
 determining a version specific upgrade program component for each of the one or more determined upgrade paths; and
 associating the determined version specific upgrade program component and a version specific upgrade program with a particular upgrade path.

15. The upgrade management system of claim 14, wherein the set of policy parameters and the one or more settings are extracted based at least in part upon an association of the determined version specific upgrade program component and the version specific upgrade program with the particular upgrade path.

16. The upgrade management system of claim 14, wherein the determined version specific upgrade program component and the version specific upgrade program are represented as Java® objects.

17. The upgrade management system of claim 16, wherein a custom Java® class loader is used to load the determined version specific upgrade program component and the version specific upgrade program in a memory.

18. A non-transitory machine-readable storage medium having instructions stored thereon, the instructions comprising program code for operations comprising:
 determining, by an upgrade management system on a computing system, a configuration of an access manager that executes on the computing system, the configuration defining a first version of the access manager that protects access to one or more resources, wherein the configuration includes one or more settings defining functionality of the first version of the access manager, and wherein the first version of the access manager executes based on a policy configuration that defines access to the one or more resources for a plurality of users;
 extracting, by the upgrade management system, a set of policy parameters of the policy configuration for the first version of the access manager, wherein the set of policy parameters indicates an authentication scheme for authenticating a client operated by a user and indicates an authorization policy for determining authentication of each of the plurality of users;
 extracting, by the upgrade management system, the one or more settings indicated by the configuration of the first version of the access manager;

adjusting, by the upgrade management system, the extracted set of policy parameters to an updated set of policy parameters for an updated policy configuration, the updated policy configuration defining access to the one or more resources by a second version of the access manager for execution on the computing system, wherein adjusting the extracted set of policy parameters includes converting the extracted set of policy parameters for adjustment into the updated set of policy parameters to change from the first version to the second version of the access manager;

adjusting, by the upgrade management system, the one or more extracted settings to one or more updated settings in an updated configuration for a second version of the access manager, the updated configuration defining functionality for the second version to protect access to the one or more resources;

storing, by the upgrade management system, the updated set of policy parameters and the one or more updated settings to an import file for migration from the first version of the access manager to the second version of the access manager;

configuring, by the upgrade management system using the import file, the second version of the access manager for execution on the computing system based on the updated configuration;

configuring, by the upgrade management system using the import file, the second version of the access manager to protect access to the one or more resources for a plurality of users based on the updated set of policy parameters in the updated policy configuration; and changing execution of the access manager on the computing system from the first version to the second version based on configuring the second version of the access manager according to the updated configuration and the updated policy configuration.

* * * * *